(12) United States Patent
Tang et al.

(10) Patent No.: US 11,466,805 B2
(45) Date of Patent: Oct. 11, 2022

(54) INTELLIGENT PLUGGING ROBOT AND METHOD FOR LONG-DISTANCE PIPELINE REROUTING, MAINTAINING AND REPAIRING CONSTRUCTION

(71) Applicant: Southwest Petroleum University, Chengdu (CN)

(72) Inventors: Yang Tang, Chengdu (CN); Yuan Wang, Chengdu (CN); Haoyu Xiong, Chengdu (CN); Jinzhong Wang, Chengdu (CN); Mingbo Wang, Chengdu (CN); Wen Yang, Chengdu (CN); Guangjie Yuan, Chengdu (CN); Xiang Gao, Chengdu (CN); Jie Wu, Chengdu (CN); Shouhong Ji, Chengdu (CN); Guorong Wang, Chengdu (CN); Hao Hou, Chengdu (CN); Meng Li, Chengdu (CN); Li Gu, Chengdu (CN)

( * ) Notice: Subject to any disclaimer, the term of this patent is extended or adjusted under 35 U.S.C. 154(b) by 0 days.

(21) Appl. No.: 17/686,341

(22) Filed: Mar. 3, 2022

(65) Prior Publication Data
US 2022/0282820 A1 Sep. 8, 2022

(30) Foreign Application Priority Data
Mar. 3, 2021 (CN) .......................... 202110233935.4

(51) Int. Cl.
*F16L 55/10* (2006.01)
*F16L 55/128* (2006.01)
(Continued)

(52) U.S. Cl.
CPC ........... *F16L 55/1283* (2013.01); *F16L 55/18* (2013.01); *F16L 55/44* (2013.01)

(58) Field of Classification Search
CPC ........ F16L 55/1283; F16L 55/18; F16L 55/44
(Continued)

(56) References Cited

U.S. PATENT DOCUMENTS

| 2,590,860 | A | * | 4/1952 | Hoebeke | ............... | G01M 3/022 |
|---|---|---|---|---|---|---|
| | | | | | | 138/90 |
| 3,381,714 | A | * | 5/1968 | Johnson | ............... | G01M 3/005 |
| | | | | | | 73/40.5 R |

(Continued)

FOREIGN PATENT DOCUMENTS

| CN | 103953817 A | 7/2014 |
|---|---|---|
| CN | 105570609 A | 5/2016 |

(Continued)

*Primary Examiner* — James F Hook

(57) ABSTRACT

The invention discloses an intelligent plugging robot and method thereof for rerouting, maintaining and repairing long-distance pipelines. The intelligent plugging robot includes a through-flow governor, a flow-blocking mechanism and a telescopic mechanism, wherein the through-flow governor and the flow-blocking mechanism are symmetrically distributed on both sides of the device. The invention can realize remote, fast, safe and accurate plugging during maintaining and repairing the long-distance pipeline, wherein the telescopic mechanism cooperates with the flow-blocking mechanism to move autonomously in the pipe to achieve precise positioning, the through-flow governor can not only adjust the plugging robot but also ensure the cleaning of the pipe wall, make it stable contact with the signal transceiver, and realize the stable communication between the robot in the pipe and the remote monitoring machine.

3 Claims, 9 Drawing Sheets

(51) Int. Cl.
*F16L 55/44* (2006.01)
*F16L 55/18* (2006.01)

(58) Field of Classification Search
USPC .................................. 138/89, 91, 93, 97, 90
See application file for complete search history.

(56) References Cited

U.S. PATENT DOCUMENTS

| | | | | | |
|---|---|---|---|---|---|
| 3,495,626 | A | * | 2/1970 | Nagel | F16L 55/1283 324/67 |
| 3,690,348 | A | * | 9/1972 | Patterson | F16L 55/1283 15/104.061 |
| 4,026,329 | A | * | 5/1977 | Thompson | F16L 55/1283 337/140 |
| 4,272,984 | A | * | 6/1981 | Bell | G01M 3/005 73/40.5 R |
| 4,852,391 | A | * | 8/1989 | Ruch | F16L 55/1283 73/40.5 R |
| 4,854,384 | A | * | 8/1989 | Campbell | F16L 55/32 166/134 |
| 4,875,615 | A | * | 10/1989 | Savard | B23K 9/325 29/402.13 |
| 5,293,905 | A | * | 3/1994 | Friedrich | F16L 55/1283 166/135 |
| 2007/0023096 | A1 | * | 2/2007 | Buckley | F16L 55/132 73/49.8 |
| 2007/0220733 | A1 | * | 9/2007 | Crocker | F16L 55/179 29/522.1 |
| 2011/0301893 | A1 | * | 12/2011 | Leal Diaz | F16L 55/1283 702/65 |

FOREIGN PATENT DOCUMENTS

| | | |
|---|---|---|
| CN | 108730669 A | 11/2018 |
| CN | 109737264 A | 5/2019 |
| CN | 110762288 A | 2/2020 |
| CN | 111720652 A | 9/2020 |
| CN | 112228687 A | 1/2021 |
| DE | 102008012868 A1 | 10/2008 |
| DE | 202013104036 U1 | 9/2013 |
| JP | 2000009240 A | 1/2000 |

* cited by examiner

INTELLIGENT PLUGGING ROBOT AND METHOD FOR LONG-DISTANCE PIPELINE REROUTING, MAINTAINING AND REPAIRING CONSTRUCTION

CROSS-REFERENCE TO RELATED APPLICATIONS

This application claims priority to Chinese Application No. 202110233935.4, which is filed on Mar. 3, 2021, and entitled "INTELLIGENT PLUGGING ROBOT AND METHOD FOR LONG-DISTANCE PIPELINE REROUTING, MAINTAINING AND REPAIRING CONSTRUCTION", the contents thereof are hereby incorporated by reference.

TECHNICAL FIELD

The invention relates to a pipeline maintaining and repairing tool, in particular to an intelligent plugging robot for long-distance pipeline rerouting, maintaining and repairing construction.

BACKGROUND

Oil and gas energy is still one of the necessary energy sources for the strategic energy reserves of various countries all over the world. With the obvious improvement of people's living standards, the society's demand for energy is also increasing continuously, and the transportation of oil and gas is a must in production. In the face of the failure of long-distance oil and gas pipelines due to various uncertain factors or man-made damage in the external environment for a long time, the repairing and maintenance of long-distance oil and gas pipelines is very important. During the maintenance operation of long-distance oil and gas pipelines, in the face of local damage and destruction of the pipeline, it is necessary to replace the damaged section to ensure the normal transportation of oil and gas and reduce the loss of oil and gas resources.

In the process of maintaining and repairing long-distance oil and gas pipelines, it is necessary to replace the damaged pipeline section. First, the two ends of the pipeline section are plugged. The existing plugging method is to manually drill holes and then put the plugging head into the holes. This method not only consumes a lot of manpower and material resources, but also results in an interruption of oil and gas transportation for a long time. Drilling also damages the pipeline, and causes serious economic losses.

However, when the intelligent plugging robot for pipeline is used for operation, the robot moves in the pipe to the two ends of the pipeline section that needs to be maintained to perform effective and rapid plugging, which avoids oil and gas transportation stoppage and manual drilling, and improves the maintenance and repairing efficiency of the pipeline. The existing pipeline plugging robot can only be driven to move by the oil and gas in the pipe, and cannot perform completely accurate positioning, which will cause displacement deviation and affect the later repairing operation; its communication mode is complicated to operate, and the cost is high; the speed control method of the plugging robot in the pipe is complicated, and not easy to adjust.

In order to mainly solve the problem of precise positioning of the plugging robot in the existing long-distance pipeline and reduce the maintenance time in the process of pipeline maintaining and repairing, it is necessary to invent an intelligent plugging robot for long-distance pipeline rerouting, maintaining and repairing construction, so as to realize long-term accurate positioning, stability and controllability of the plugging process of oil and gas pipelines, quick response to sealing and unsealing commands, and small distance deviation between the action point and the target point, so as to improve the repairing efficiency of long-distance oil and gas pipelines, and improve stability and reliability of plugging and anchoring.

SUMMARY OF THE INVENTION

(1) Technical Problems To Be Solved

The purpose of the present invention is: aiming at the problems and demands of existing oil and gas pipeline plugging tools, to provide an intelligent plugging robot for long-distance pipeline rerouting, maintaining and repairing construction, and its communication mode solves the problem of slow or unstable response speed of control center when it controls the plugging robots, the telescopic mechanism and the blocking mechanism can be used to achieve precise positioning of the plugging robot in the pipeline; the through-flow governor can not only clean the pipe wall, but also ensure that the signal transceiver and the pipe wall can be kept in smooth connection. It can also control the flow rate of oil and gas to ensure that the speed of the plugging robot in the pipe can be adjusted.

(2) Technical Solutions

In order to achieve the above purpose, the present invention provides the following technical solutions: an intelligent plugging robot for long-distance pipeline rerouting, maintaining and repairing construction, characterized in that: the intelligent plugging robot includes a through-flow governor, a flow-blocking mechanism and a telescopic mechanism, wherein there are two through-flow governors and two flow-blocking mechanisms, and they are symmetrically distributed on both sides of the telescopic mechanism.

The flow-blocking mechanisms are located on both sides of the inner side of the robot, and includes a hydraulic cylinder I, a piston I, a piston rod I, a pressure-bearing table, a fixed holding seat, a shock-absorbing roller, circumferential locking slips, a sealing rubber ring and a conical seat, wherein the hydraulic cylinder I and the piston I are located in the middle of the flow-blocking mechanism, the piston I is connected to the pressure-bearing table through a nut. The hydraulic cylinder I is fixed on the fixed holding seat. The inner wall of the side casing of the fixed holding seat is closely attached to the outer wall of the side casing of the pressure-bearing table, and the radial outer part of the fixed holding seat is distributed with a sealing rubber ring, a conical seat, circumferential locking slips and a shock-absorbing roller.

The through-flow governor is located at the outermost end of the robot, and includes a leather cup, a through-flow governor casing, a guide head, a signal transceiver, a three-lobed sector through-flow device, a baffle, a motor I, a battery and a communication device. There are two leather cups, made of colloidal material, which are fixed on both ends of the through-flow governor casing by bolts; the three-lobed sector through-flow device is fixed with the through-flow governor casing through screws, and there is a space in the center of the three-lobed sector through-flow device to install the motor I, battery and communicator, and there is a three-lobed sector channel with a gap in its outer ring; the rear end of the three-lobed sector through-flow device is equipped with a rotatable baffle, and the baffle is also a three-lobed sector structure, its center is connected to the motor I; the front end of the three-lobed sector through-flow device is equipped with a guide head, which is semi-ellipsoid, with a sharp tip and a wide rear. The inner steps of the guide head penetrate into the three-lobed fan-shaped flow device and is in close contact with its inside; the rear end of the through-flow speed governor is equipped with a signal transceiver.

The telescopic mechanism is located in the middle of the robot, including a three-position four-way solenoid valve, an accumulator base, an accumulator, a partition I, a partition II, a motor II, a micro hydraulic pump base, a micro hydraulic pump, an oil storage cylinder, a telescopic mechanism hydraulic cylinder cover, a hydraulic cylinder II, a piston II, a PLC controller, a two-position two-way solenoid valve, an upper cover of telescopic mechanism, a lower cover of telescopic mechanism, a cover I, a cover II, a cover III. The telescopic mechanism, the through-flow governor and the flow-blocking mechanism are connected with each other by the helical pipeline and the steering ball rod.

The circumferential locking slips are distributed outside the flow-blocking mechanism, and each included angle between circumferential locking slips is 45°, and there 8 included angles in total. The connection between the slip and the connecting rod, and between the connecting rod and the fixed holding seat is pin connection. The lower end surface of the slip is a circular arc conical surface, and the tooth cross-section shape of the upper end surface is serrated. When the slip moves along the conical seat, the connecting rod connecting one end of the slip expands and moves together with the slip radially. The connecting rod connecting the pressure-bearing table at one end moves relatively in the direction of the conical seat; when the slip is retracted, the pulling force on the connecting rod assists the slip to perform the returning movement.

The signal transceiver is a circular mesh structure, provided with antennas evenly and densely distributed alternately, the antenna is an elastic structure, inside which a cable is connected, and on the top of which a connecting piece is arranged, and the central part of the signal transceiver is a signal integration device, which is connected with the connecting piece through a cable, and the signal integration device is connected with the communicator through a cable.

A plugging method using an intelligent plugging robot inside a pipe, characterized in that two identical robots are required to cooperate with each other when performing pipeline plugging, and the working procedures can be divided into four stages i.e. ground preparation, lowering and positioning, anchoring and plugging, and anchor lifting and recovering. The steps are as follows:

S1. During the ground preparation process, first-level signal transceivers devices are set on the outer wall of the two ends of the target pipe section, and the remote monitoring machines are debugged at the same time;

S2. During lowering and positioning process, two robots are successively placed from the external wellhead to ensure that they have enough interval in the pipe. The PLC controller in the plugging robot transmits the working signal to the communicator, and then passes the signal after a signal conversion to the first-level signal transceiver device by the signal transceiver contacting the pipe wall and transmits it to the second-level signal transceiver as wireless signal through the signal filtering device, and finally transmits it to the remote monitoring machine, so that the outside world can monitor the position and working status of the plugging robot in the pipe in real time. ;

S3. When the plugging robot is about to reach the target position, the signal command of the remote monitoring machine is transmitted to the communicator in the plugging robot through the signal transceiver, and is transmitted to the PLC controller after signal conversion processing, so as to control the motor and the solenoid valve to work. The remote monitoring machine first controls the motor I to control the baffle of the through-flow governor to rotate and retract, so that the channel port is completely through-flown, and the robot decelerates, and then the remote monitoring machine controls the hydraulic oil volume in the hydraulic cylinder I by controlling the solenoid valve, Thereby, the contraction degree of the piston I is controlled and the radial expansion degree of the slips is controlled, so that the slips properly contact with the pipe wall, and the robot is allowed to decelerate and stop when it reaches the target position of the robot;

S4. The remote monitoring machine controls the telescopic mechanism and the flow-blocking mechanisms at the two ends to move toward the target position through the coordinated action of the hydraulic cylinder II and the piston II. The action program set for one movement is: slip retraction of the front-end flow-blocking mechanism—extension of the telescopic mechanism—slip anchoring of the front-end flow-blocking mechanism—slip retraction of the rear-end flow-blocking mechanism—retraction of telescopic mechanism—slip anchoring of the rear-end flow-blocking mechanism, and movements are repeated until the robot reaches the target position;

S5. The remote monitoring machine controls the piston I to continue to move, and drives the fixed holding seat to move toward the pressure-bearing table to squeeze the conical seat, and the connecting rod cooperates with the conical seat to push out the slips, which are completely anchored and stuck on the pipe wall;

S6. The plugging process is that the remote monitoring machine issues a plugging command to the two robots at the same time. The hydraulic cylinders I of the robot drive the piston I to continue to move, thereby driving the fixed holding seat to continue to move toward the conical seat and squeeze the sealing rubber ring. Under the extrusion action of the rubber ring, the sealing effect inside the pipe is realized;

S7. During the anchor lifting and recovering process, the remote monitoring machine issues a synchronous anchor lifting command to the two robots, the pistons I of the robot move in the opposite directions, the sealing rubber ring and the circumferential locking slip are retracted radially to complete the anchor lifting action, and finally the robot flows with the fluid in the pipe to the next channel port to return to the ground.

(3) Beneficial Effects

Compared with the prior art, the present invention provides an intelligent plugging robot and a method for long-distance pipeline rerouting, maintaining and repairing construction, which has the following beneficial effects:

1. An intelligent plugging robot and method for long-distance pipeline rerouting, maintaining and repairing construction provided by the present invention transmits signals through the mode of electrical conduction by oil pipe, which ensures the stable interaction between the information outside the metallic pipe and the robot information inside the metallic pipe, and improves the control accuracy of the robot.

2. An intelligent plugging robot and method for long-distance pipeline rerouting, maintaining and repairing construction provided by the present invention, the through-flow governor solves the problem of cleaning the inner wall of the pipeline, and can control the circulation of the medium in the pipe to control the robot's moving speed and also ensures signal transmission with the inner wall of the pipe.

3. An intelligent plugging robot and method for long-distance pipeline rerouting, maintaining and repairing construction provided by the present invention, the flow-blocking mechanism cooperates with the telescopic mechanism to realize the autonomous bidirectional movement function of the robot in the pipe, thereby ensuring that the accuracy of anchor positioning.

In the figure: 1-through-flow governor; 101-bolt; 102-leather cup; 103-screw; 104-signal transceiver; 1041-antenna; 1042-connecting piece; 1043-signal integration device; 105-guide head; 1051-internal steps of guide head; 106-through-flow governor casing; 107-three-lobed sector through-flow device; 108-motor I; 109-battery; 110-baffle; 111-three-lobed sector channel; 112-communicator; 2-flow-blocking mechanism; 201-fixed holding seat; 2011-side casing of fixed holding seat; 202-shock-absorbing roller; 203-sealing rubber ring; 204-conical seat; 205-circumferential locking slip; 2051-slip; 2052-connecting rod; 206-pressure-bearing table; 2061-side casing of pressure-bearing table; 207-piston I; 208-piston rod I; 209-nut; 210-hydraulic cylinder I; 3-telescopic mechanism; 301-three-position four-way solenoid valve; 302-accumulator base; 303-accumulator; 304-partition I; 305-motor II; 306-micro hydraulic pump base; 307-micro hydraulic pump; 308-oil storage cylinder; 309-telescopic mechanism hydraulic cylinder cover; 310-hydraulic cylinder II; 311-piston II; 312-PLC controller; 313-two-position two-way solenoid valve; 314-upper cover of telescopic mechanism; 315-lower cover of telescopic mechanism; 316-cover I; 317-cover II; 318-cover III; 319-partition II; 320-helical pipeline; 321-steering ball socket; 4-signal filtering device; 5-first-level signal transceiver; 6-second-level signal transceiver; 7-remote monitoring machine.

DETAILED DESCRIPTION OF PREFERRED EMBODIMENTS

Now each embodiment in the present application is further described in combination with the drawings.

DETAILED DESCRIPTION OF PREFERRED EMBODIMENTS

Figure 1:
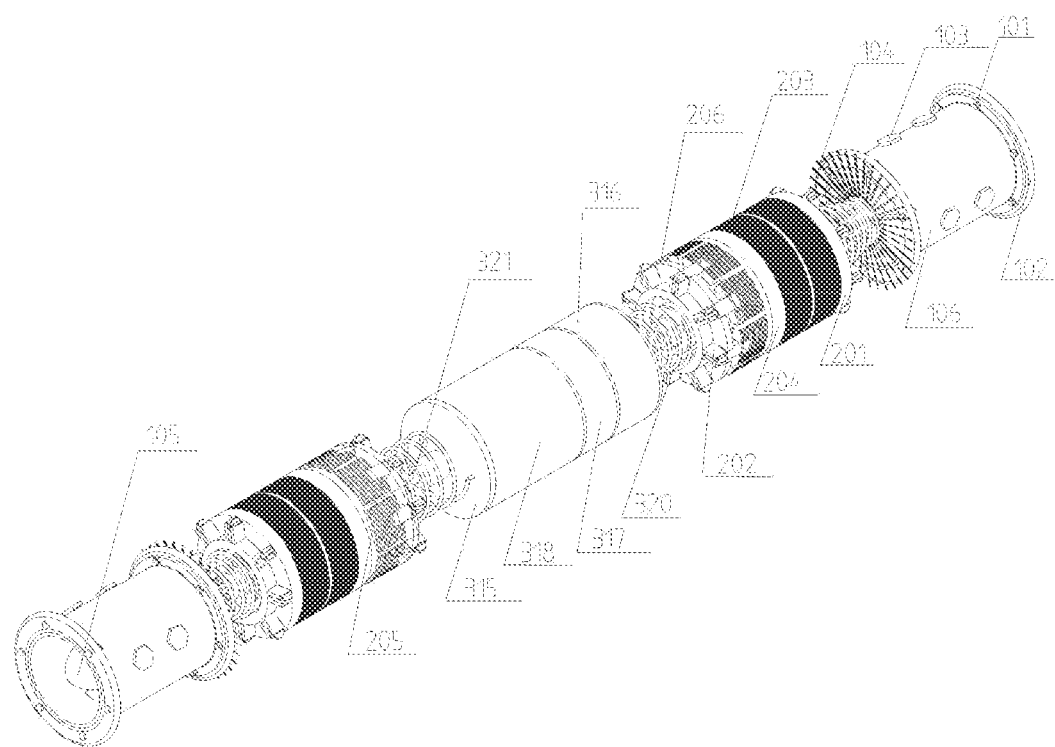
FIG. 1 is the axonometric view of the plugging robot before anchoring and plugging.
Figure 2:
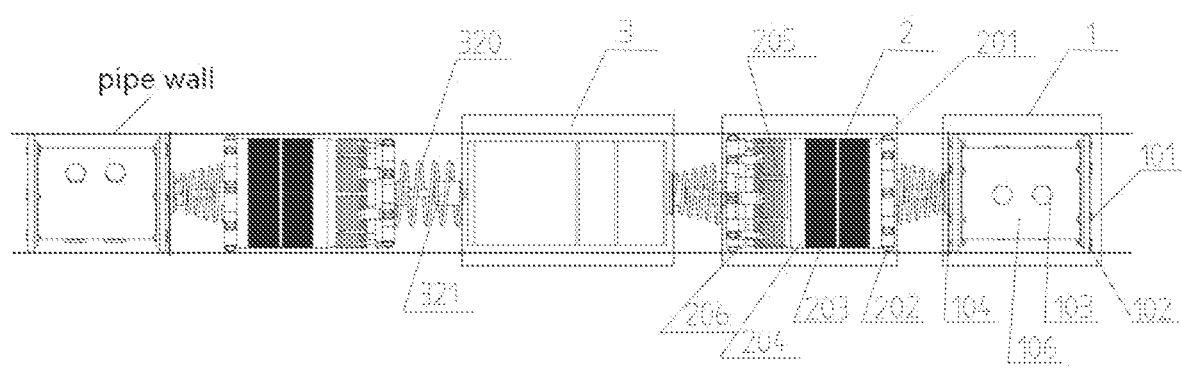
FIG. 2 is a front view of the plugging robot before anchoring and plugging.
Figure 3:
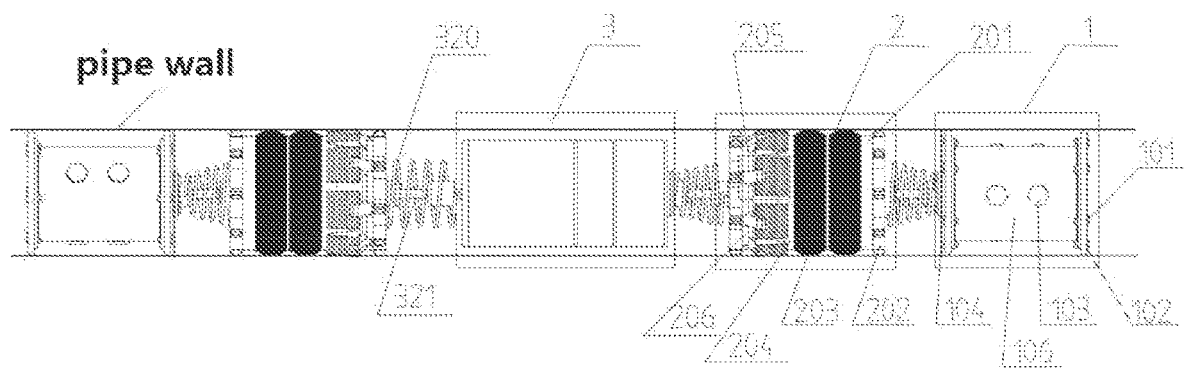
FIG. 3 is the front view of the plugging robot after anchoring and plugging.
Figure 4:
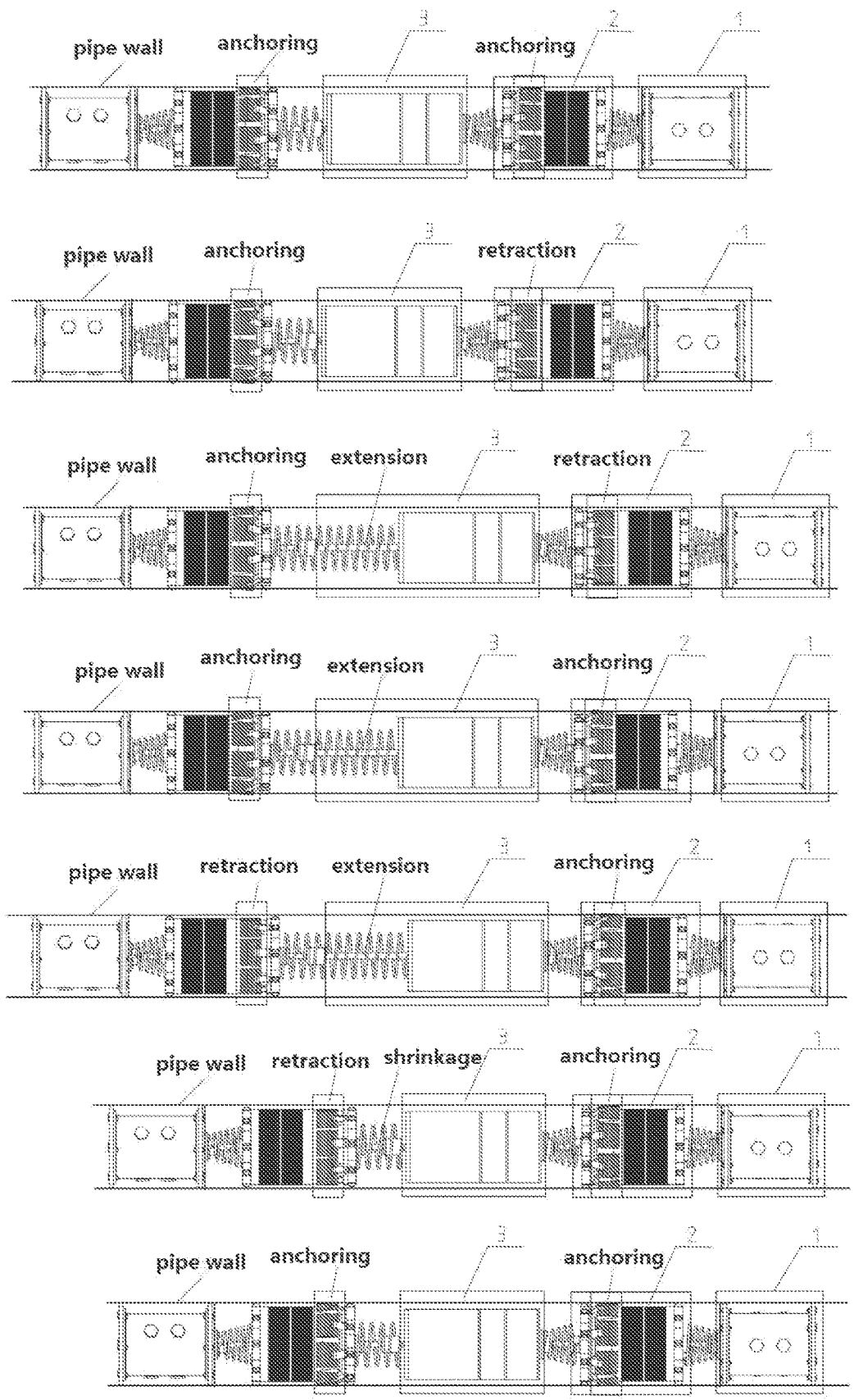
FIG. 4 is a schematic flow chart of the plugging robot walking by itself for once.
Figure 5:
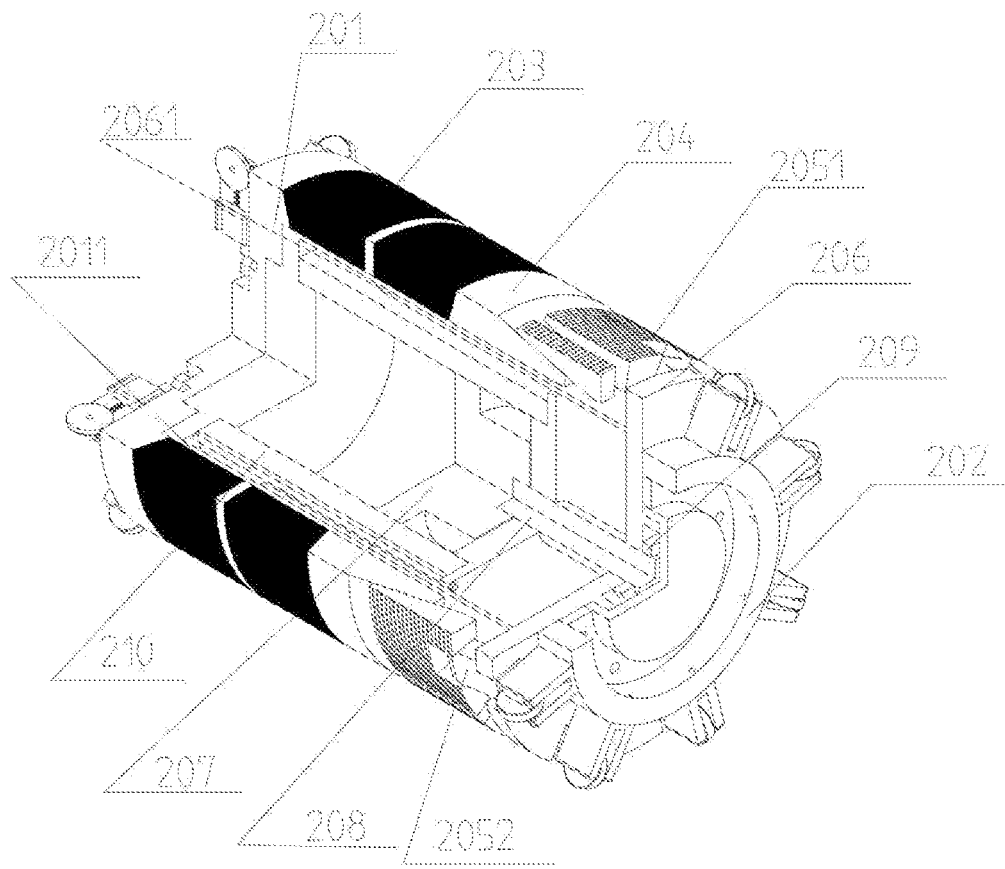
FIG. 5 is an axonometric view of the flow-blocking mechanism after ¼ thereof is cut away.
Figure 6:
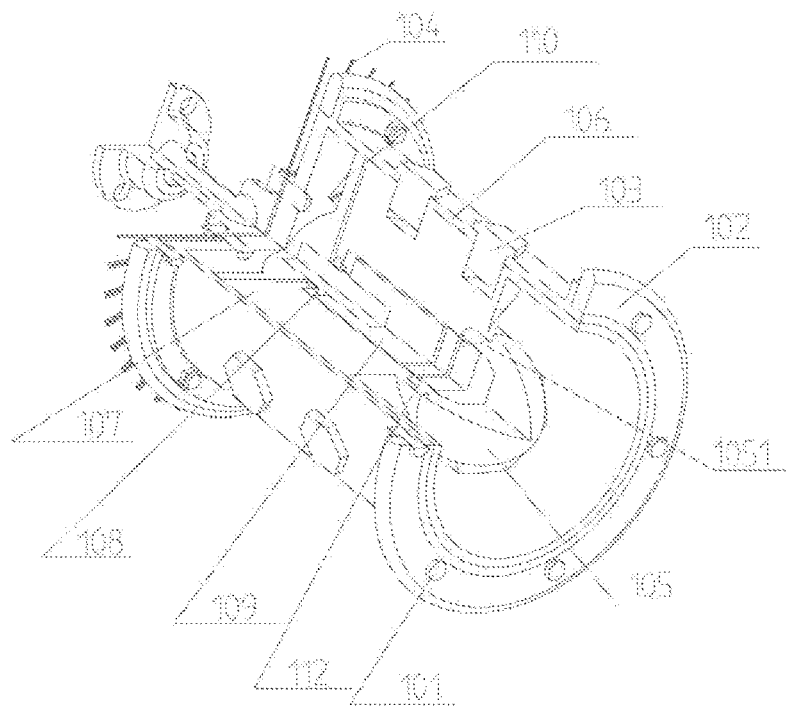
FIG. 6 is an axonometric view of the through-flow governor after ¼ thereof is cut away.
Figure 7:
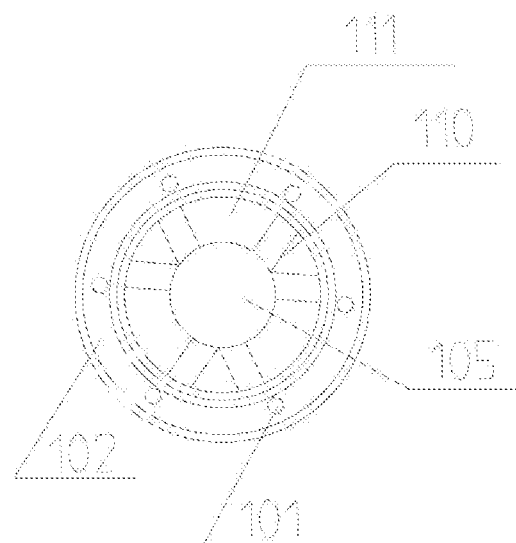
FIG. 7 is a left side view of the through-flow governor.
Figure 8:
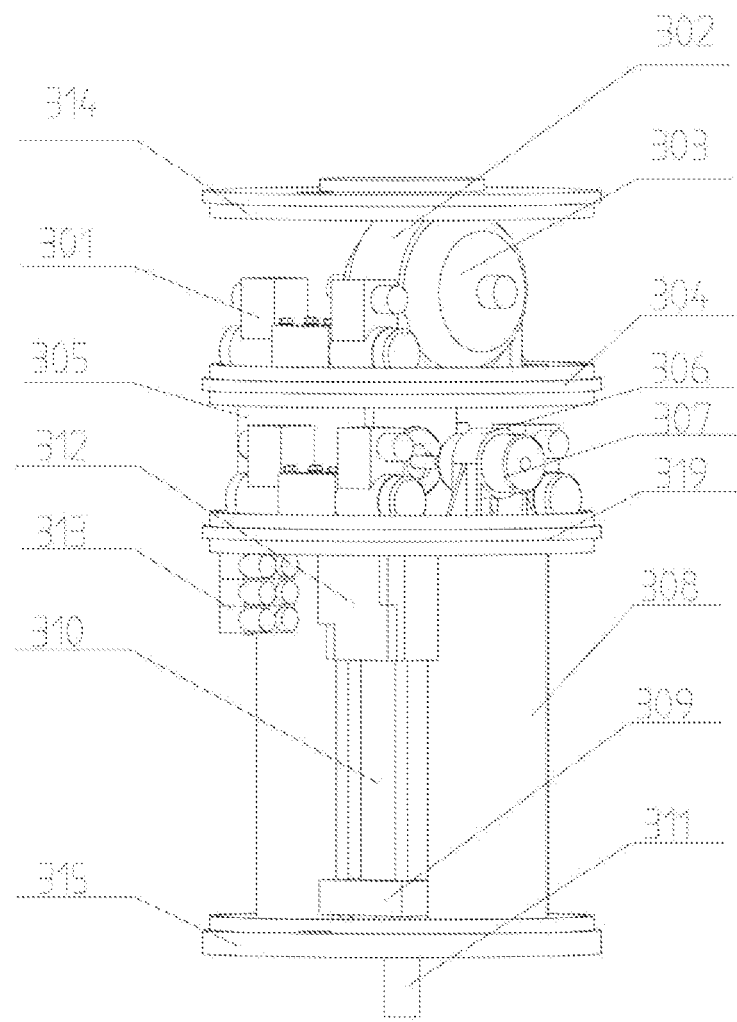
FIG. 8 is a schematic diagram of the internal structure of the telescopic mechanism after removing the cover thereof.
Figure 9:
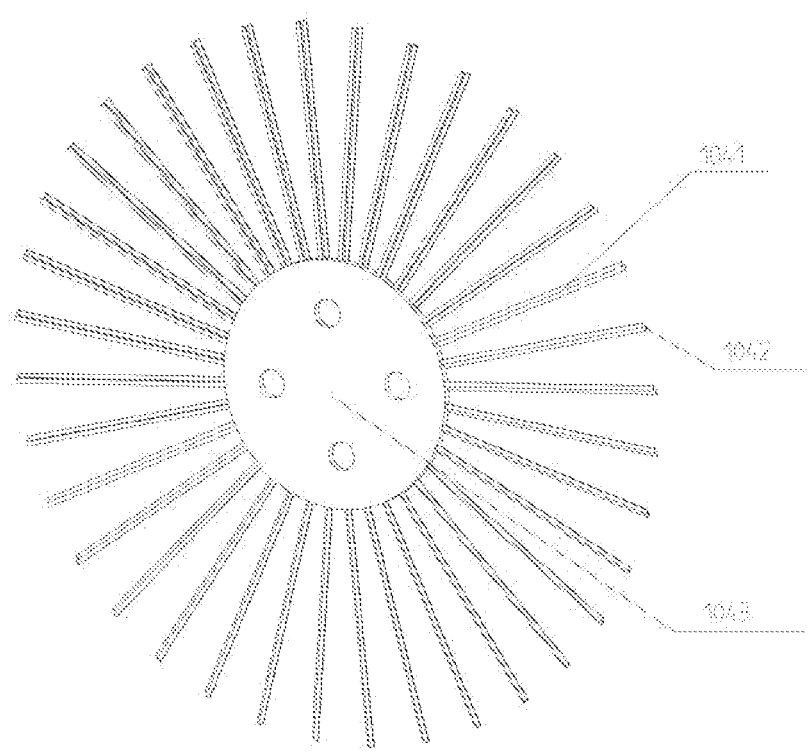
FIG. 9 is a schematic structural diagram of a signal transceiver.
Figure 10:
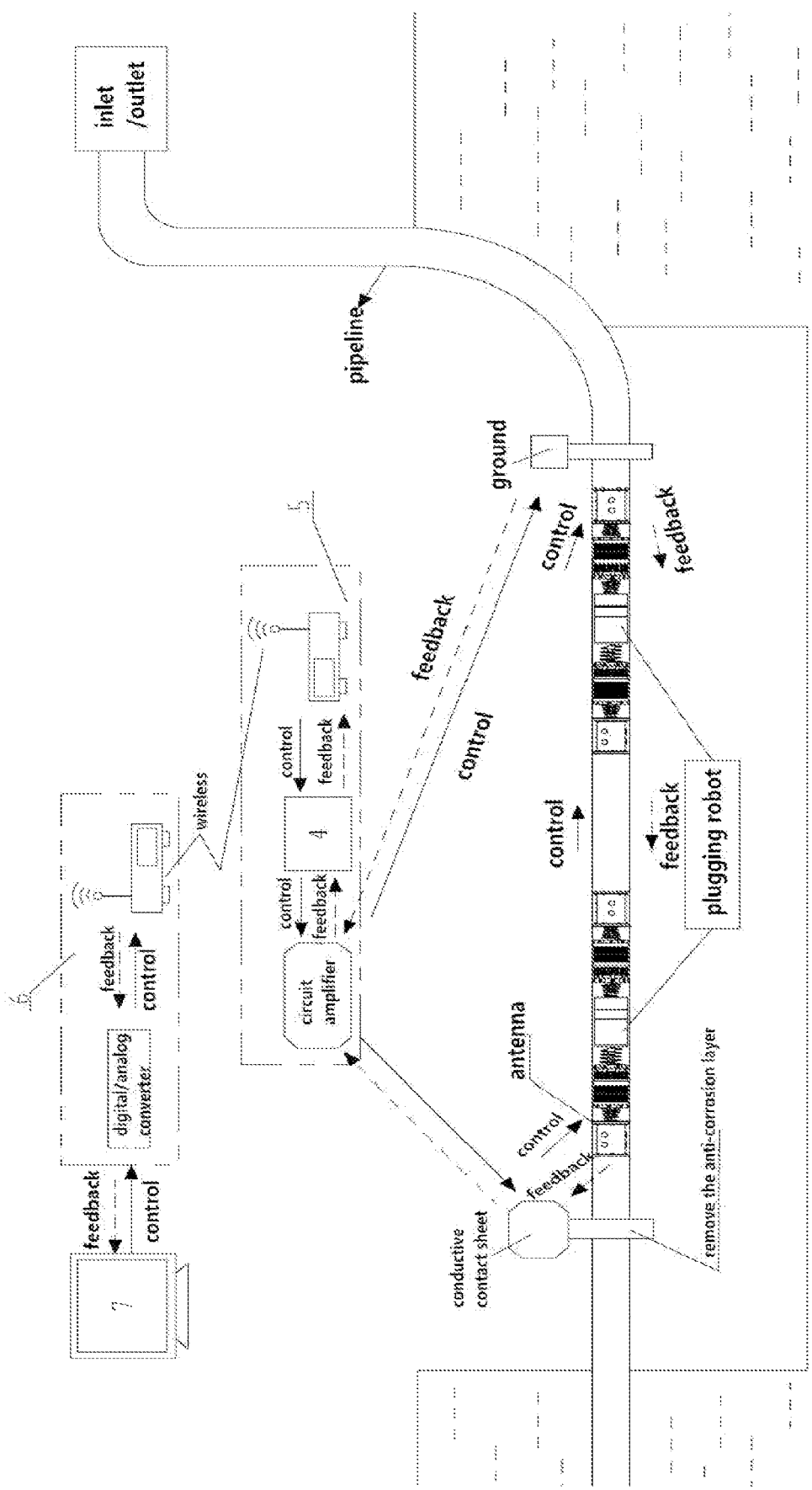
FIG. 10 is a schematic diagram of two-way communication of the plugging robot.
Figure 11:
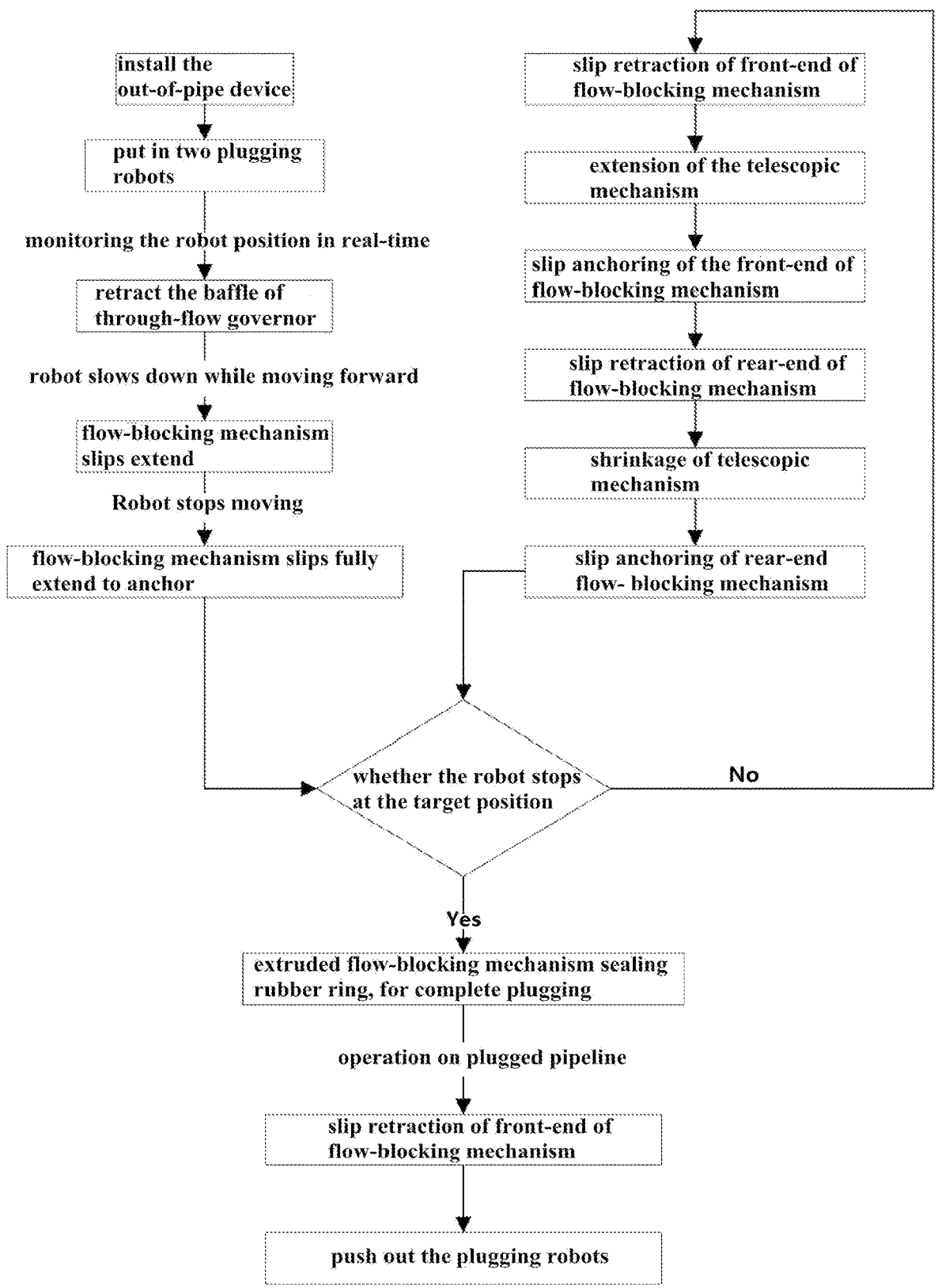
FIG. 11 is a flow chart of the plugging method of the plugging robot.

As shown in FIGS. 1-11, an intelligent plugging robot and method thereof for long-distance pipeline rerouting, maintaining and repairing construction, the intelligent plugging robot includes a through-flow governor (1), a flow-blocking mechanism (2) and a telescopic mechanism (3), wherein there are two through-flow governors (1) and two flow-blocking mechanisms (2), and they are symmetrically distributed on both sides of the telescopic mechanism (3).

The flow-blocking mechanisms (2) are located on both sides of the inner side of the robot, and includes a hydraulic cylinder I (210), a piston I (207), a piston rod I (208), a pressure-bearing table (206), a fixed holding seat (201), a shock-absorbing roller (202), circumferential locking slips (205), a sealing rubber ring (203) and a conical seat (204), wherein the hydraulic cylinder I (210) and the piston I (207) are located in the middle of the flow-blocking mechanisms (2), the piston I (207) is connected to the pressure-bearing table (206) through the nut (209), the hydraulic cylinder I (210) is fixed on the fixed holding seat (201), and the inner wall of the side casing (2011) of the fixed holding seat is closely attached to the outer wall of the side casing (2061) of the pressing table, the radial outer portion of the fixed holding seat (201) is distributed with a sealing rubber ring (203), a conical seat (204), circumferential locking slips (205) and a shock-absorbing roller (202).

The through-flow governor (1) is located at the outermost end of the robot, and includes a leather cup (102), a through-flow governor casing (106), a flow guide (105), a signal transceiver (104), a three-lobed sector through-flow device (107), a baffle (110), a motor I (108), a battery (109) and a communicator (112). There are two leather cups (102), made of colloidal material, fixed on both ends of the through-flow governor casing (106) through the bolt (101); the three-lobed sector through-flow device (107) is fixed to the through-flow governor casing (106) by screws (103), and the center of the three-lobed sector through-flow device (107) is provided with a space for installing the motor I (108), the battery (109) and the communicator (112), and a three-lobed sector channel (111) with a gap is provided on its outer ring; the rear end of the three-lobed sector through-flow device (107) is installed with a rotatable baffle (110), and the baffle (110) is also a three-lobed sector structure, and its center is connected with the motor I (108); the front end of the three-lobed sector through-flow device (107) is provided with a guide head in semi-ellipsoid, with a sharp tip and a wide rear, and the inner steps (1051) of the guide head penetrate into the inner of the three-lobed sector through-flow device (107) and is in close contact with it; the rear end of the through-flow governor (1) is equipped with a signal transceiver (104).

The telescopic mechanism (3) is located in the middle of the robot, and includes a three-position four-way solenoid valve (301), an accumulator base (302), an accumulator (303), a partition I (304), and a partition II (319), a motor II (305), a micro hydraulic pump base (306), a micro hydraulic pump (307), an oil storage cylinder (308), a telescopic mechanism hydraulic cylinder cover (309), a hydraulic cylinder II (310), a piston II (311), a PLC controller (312), a two-position two-way solenoid valve (313), an upper cover of telescopic mechanism (314), a lower cover of telescopic mechanism (315), a cover I (316), a cover II (317), a cover III (318). The telescopic mechanism (3), the through-flow governor (1) and the flow-blocking mechanism (2) are connected with each other by the steering ball rod (321) and the helical pipeline (320).

The circumferential locking slips (205) are distributed outside the flow-blocking mechanisms (2), and there are a total of 8 included angles among the circumferential locking slips (205), the degree of which is 45° respectively; the connection between the slip (2051) and the connecting rod (2052), the connecting rod (2052) and the fixed holding seat (201) is pin connection, the lower end surface of the slip (2051) is a circular arc conical surface, and the tooth cross-sectional shape of the upper end surface is zigzag, the connecting rod (2052) connecting with the slips (2051) at one end of the slip (2051) expands radially with slips (2051) when the slips (2051) are moving along the conical seat (204), and the connecting rod (2052) connecting the pressure-bearing table (206) at one end moves relative to the direction of the conical seat (204); when the slips (2051) are retracted, the pulling force on the connecting rod (2052) assists the slips (2051) in performing a returning movement.

The signal transceiver (104) is of a circular mesh structure, on which antennas (1041) in the form of elastic structure are evenly and densely distributed alternately. Inside the antennas (1041) a cable is arranged and the top part of the antenna (1041) is provided with a connecting piece (1042), and the central part of the transceiver (104) is a signal integration device (1043), which is connected with the connecting piece (1042) through a cable, and the signal integration device (1043) is connected with the communicator (112) through a cable.

The plugging method for plugging inside a pipe using an intelligent plugging robot requires two identical robots to work together during pipeline plugging, and the working procedures can be divided into four stages i.e. ground preparation, lowering and positioning, anchoring and plugging, anchor lifting and recovering. During the ground preparation process, first-level signal transceivers (5) are installed on the outer walls of both ends of the target pipe section, and the remote monitoring machine (7) is debugged at the same time; two robots are placed in the wellhead to ensure that they have enough interval in the pipe during the lowering and positioning process. The lowering and positioning process has three stages. In the first stage, the remote monitoring machine (7) first controls the baffle (110) of the through-flow governor (1) to rotate to make the channel port completely overflow, and the robot decelerates. In the second stage, the remote monitoring machine (7) controls the degree of radial expansion of the slips (2051) by controlling the contraction degree of the piston I (207), and the robot is decelerated to stop by controlling the slips (2051) to properly contact the pipe wall, and after the robot in the pipe stops stably, it enters the third stage, and the remote monitoring machine (7) controls the telescopic mechanism (3) together with the flow- blocking mechanism to move toward the target position through the coordinated action of the hydraulic cylinder II (310) and the piston II (311). The action programme for one movement is configured as follows:

Slip retraction of front-end flow-blocking mechanism-extension of telescopic mechanism—slip anchoring of front-end flow-blocking mechanism—slip retraction of rear-end flow-blocking mechanism-retraction of telescopic mechanism —slip anchoring of rear-end flow-blocking mechanism, and movements are repeated until the robots arrive target position; during the anchoring and plugging process, the signal transceiver (104) inside the robot transmits the signal to the first-level signal transceiver device (5) through the pipe wall, and then transmits the signal to the second-level signal through the signal filtering device (4) as a wireless signal and is finally transmitted to the remote monitoring machine (7), after which the remote monitoring machine (7) immediately issues an anchoring command to control the piston I (207) of the robot to drive the fixed holding seat (201) to move toward the pressure-bearing table (206) to squeeze the conical seat (204), push out the slips (2051) to act on the inner wall of the pipeline to complete the anchoring, and then the remote monitoring machine (7) issues a plugging command to the two robots at the same time, the robot's hydraulic cylinder I (210) drives the piston I (207) to continue to move, thereby driving the fixed holding seat (201) to continue to move toward the conical seat (204) and squeeze the sealing rubber ring (203), under the extrusion action of the sealing rubber ring, the sealing inside the pipeline is realized. During the anchor lifting and recovering process, the remote monitoring machine (7) issues a synchronous anchor lifting command to the two robots, and the pistons I (207) of the robots move in the opposite directions, the circumferential locking slips (205) are radially retracted to complete the anchoring action, and finally the robots follow the fluid inside the pipe to the next channel port and return to the ground.

What is claimed is:

1. An intelligent plugging robot for long-distance pipeline rerouting, maintaining and repairing construction, characterized in that the intelligent plugging robot comprises through-flow governors (1), flow-blocking mechanisms (2), and a telescopic mechanism (3), wherein there are two through-flow governors (1) and two flow-blocking mechanisms (2) symmetrically distributed on both sides of the telescopic mechanism (3);

the flow-blocking mechanisms (2) are located on both sides of an inner side of the plugging robot, including a hydraulic cylinder I (210), a piston I (207), a piston rod I (208), a pressure-bearing table (206), a fixed holding seat (201), a shock-absorbing roller (202), circumferential locking slips (205), a sealing rubber ring (203) and a conical seat (204), wherein the hydraulic cylinder I (210) and the piston I (207) are located in a middle of the flow-blocking mechanism (2), and the piston I (207) is connected to the pressure-bearing table (206) through a nut (209), the hydraulic cylinder I (210) is fixed on the fixed holding seat (201), and an inner wall of a side casing (2011) of the fixed holding seat is in close contact with an outer wall of the side casing (2061) of the pressure-bearing table, and a radial outer portion of the fixed holding seat (201) is distributed with the sealing rubber ring (203), the conical seat (204), the circumferential locking slips (205) and the shock-absorbing roller (202), the circumferential locking slips (205) are composed of slips (2051) and connecting rods (2052);

the through-flow governor (1) is located at an outermost end of the plugging robot, and includes a leather cup (102), a through-flow governor casing (106), a flow guide (105), a signal transceiver (104), and a three-lobed sector through-flow device (107), a baffle (110), a motor I (108), a battery (109) and a communicator (112); there are two leather cups (102) made of colloidal material, fixed on two ends of the through-flow governor casing (106) by bolts (101); the three-lobed sector through-flow device (107) is fixed to the through-flow governor casing (106) by screws (103), and a space is provided in a center of the three-lobed sector through-flow device (107) to install the motor I (108), the battery (109) and the communicator (112), a three-lobed sector channel (111) with a gap is provided in its outer ring; a rotatable baffle (110) is installed at a rear end of the three-lobed sector through-flow device (107), the baffle (110) is also a three-lobed sector structure, and a center of the baffle is connected with the motor I (108); a front end of the three-lobed sector through-flow device (107) is equipped with a guide head (105), which is semi-ellipsoid-shaped, with a sharp tip and a wide rear; an inner step (1051) of the guide head penetrates into the three-lobed sector through-flow device (107) and is in close contact with its inner portions, a rear end of the through-flow governor (1) is equipped with a signal transceiver (104);

the telescopic mechanism (3) is located in a middle of the plugging robot, and includes a three-position four-way solenoid valve (301), an accumulator base (302), an accumulator (303), a partition I (304), a partition II (319), and a motor II (305), a micro hydraulic pump base (306), a micro hydraulic pump (307), an oil storage cylinder (308), a telescopic mechanism hydraulic cylinder cover (309), a hydraulic cylinder II (310), a piston II (311), a PLC controller (312), a two-position two-way solenoid valve (313), an upper cover of telescopic mechanism (314), a lower cover of telescopic mechanism (315), a cover I (316), a cover II (317), a cover III (318); the telescopic mechanism (3), the through-flow governor (1) and the flow-blocking mechanism (2) are connected with each other via a steering ball rod (321) and a helical pipeline (320).

2. The intelligent plugging robot for long-distance pipeline rerouting, maintaining and repairing construction according to claim 1, wherein the signal transceiver (104) is a circular mesh structure, on which antennas (1041) are evenly and densely are distributed alternately, the antennas (1041) are in elastic structure provided with a cable inside, a connecting piece (1042) is provided on a top thereof, a center of the signal transceiver (104) is a signal integration device (1043), which is connected with the connecting piece (1042) through the cable, and at the same time the signal integration device (1043) communicates with the communicator (112) through the cable.

3. A plugging method using the intelligent plugging robot for long-distance pipeline rerouting, maintaining and repairing construction according to claim 2, characterized in that: two identical plugging robots are required to cooperate when carrying out pipeline plugging and the work procedures are divided into four stages: ground preparation, lowering and positioning, anchoring and plugging, and anchor lifting, the steps are as follows:

S1: during the ground preparation process, arranging a first-level signal transceiver (5) is arranged on outer walls of two ends of a target pipe section, and debugging a remote monitoring machine (7) at the same time;

S2: during the lowering and positioning process, placing two plugging robots successively from an external wellhead to ensure that they have sufficient interval in a pipe, and the PLC controller (312) in the plugging robot transmits a working signal to the communicator (112), after performing a signal conversion, the working signal is transmitted to a first-level signal transceiver device (5) through the signal transceiver (104) in contact with a pipe wall, after being processed by a signal filtering device (4), it is further transmitted to a second-level signal transceiver device (6) as a wireless signal, and finally, it is transmitted to the remote monitoring machine (7), so that positions and working status of the plugging robot in the pipe is monitored in real time;

S3: when the plugging robot is about to reach a target position, a signal command of the remote monitoring machine (7) is transmitted to the communicator (112) in the plugging robot through the signal transceiver (104), and is transmitted to the PLC controller (312) after signal conversion processing, thereby controlling the motor and the solenoid valve to work, the remote monitoring machine (7) first controls the motor I (108) to control the baffle (110) of the through-flow governor (1) to rotate and retract, so that a channel port is completely through-flown, and the plugging robot decelerates, and then the remote monitoring machine (7) regulates a amount of hydraulic oil in the hydraulic cylinder I (210) by controlling the solenoid valve, thereby controlling a degree of contraction of the piston I (207) and then controlling degrees of radial expansion of the slips (2051), so that the slips (2051) properly contact the pipe wall, to force the plugging robot to slow down and stop when the plugging robot reaches the target position thereof;

S4: the remote monitoring machine (7) controls the telescopic mechanism (3) and the flow-blocking mechanism (2) at its two ends to move toward the target position through a coordinated action of the hydraulic cylinder II (310) and the piston II (311), and movements are repeated until the plugging robot reaches the target position;

S5: the remote monitoring machine (7) controls the piston I (207) to continue to move, and drives the fixed holding seat (201) to move toward the pressure-bearing table (206) to squeeze the conical seat (204), and the connecting rod (2052) cooperates with the conical seat (205) to push out the slips (2051) and completely anchor them on the pipe wall;

S6: the blocking process is that the remote monitoring machine (7) issues plugging commands to the two plugging robots at the same time, and the hydraulic cylinder I (210) of the plugging robots drives the piston I (207) to continue to move, thereby driving the fixed holding seat (201) to continue to move toward the conical seat (204) and squeezes the sealing rubber ring (203), and a sealing effect inside the pipeline is realized under a pressing action of the sealing rubber ring;

S7: the remote monitoring machine (7) issues a synchronous anchor lifting command to the two plugging robots, the pistons I (207) of the plugging robot move in opposite directions, the sealing rubber ring (203) and the circumferential locking slip (205) radially retract to complete an anchor lifting action, and finally the plugging robots flow to the next channel port and thus returns to ground together with fluid in the pipe.

* * * * *